United States Patent
Nakano

(10) Patent No.: US 11,479,237 B2
(45) Date of Patent: Oct. 25, 2022

(54) CONTROLLER AND CONTROL METHOD FOR HYBRID VEHICLE

(71) Applicant: TOYOTA JIDOSHA KABUSHIKI KAISHA, Toyota (JP)

(72) Inventor: Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 16/807,602

(22) Filed: Mar. 3, 2020

(65) Prior Publication Data
US 2020/0298831 A1 Sep. 24, 2020

(30) Foreign Application Priority Data
Mar. 22, 2019 (JP) .............................. JP2019-055225

(51) Int. Cl.
*B60W 20/40* (2016.01)
*B60W 10/02* (2006.01)
*B60W 10/06* (2006.01)

(52) U.S. Cl.
CPC ............ *B60W 20/40* (2013.01); *B60W 10/02* (2013.01); *B60W 10/06* (2013.01); *B60W 2510/0638* (2013.01); *B60W 2510/081* (2013.01)

(58) Field of Classification Search
CPC ...... B60W 20/40; B60W 10/02; B60W 10/06; B60W 2510/0638; B60W 2510/081; B60W 2050/0088; B60W 10/08; B60W 30/182; B60K 6/48; F02N 5/04; F02N 11/04; F02N 2200/041; F02N 2300/2002;
(Continued)

(56) References Cited

U.S. PATENT DOCUMENTS 9,440,641 B2 * 9/2016 Kitabatake ............ B60K 6/445
2002/0170758 A1 * 11/2002 Shimabukuro ....... B60W 10/08
903/918
(Continued)

FOREIGN PATENT DOCUMENTS

CN 105365807 A * 3/2016 ............ B60K 6/387
DE 112007000225 T5 * 2/2009 ............... B60K 6/48
(Continued)

OTHER PUBLICATIONS

DE-112007000225-T5 translation (Year: 2009).*
(Continued)

*Primary Examiner* — Jeff A Burke
*Assistant Examiner* — Kyle T Johnson
(74) *Attorney, Agent, or Firm* — Oliff PLC

(57) ABSTRACT

Upon a request for switching from a first travel mode of traveling with a clutch disengaged and operation of an engine stopped to a second travel mode of traveling with the clutch engaged and the engine operating, a controller for a hybrid vehicle restarts the engine in the following manner. That is, the controller restarts the engine in a first start mode of starting combustion in the engine with the clutch non-fully engaged when a rotation speed of a motor is greater than a determination value and restarts the engine in a second start mode of starting combustion in the engine with the clutch fully engaged when the rotation speed of the motor is less than or equal to the determination value.

4 Claims, 4 Drawing Sheets

(58) Field of Classification Search
CPC .. F02N 11/0803; F02N 11/103; F02N 11/108; Y02T 10/40; Y02T 10/62
See application file for complete search history.

(56) References Cited

U.S. PATENT DOCUMENTS

| | | | |
|---|---|---|---|
| 2008/0182722 A1* | 7/2008 | Colvin | B60W 30/20 477/180 |
| 2009/0312895 A1* | 12/2009 | Kim | B60K 6/48 903/902 |
| 2014/0094340 A1* | 4/2014 | Yoshikawa | B60W 20/10 903/902 |
| 2015/0136253 A1* | 5/2015 | Kuwahara | F16D 25/14 137/596 |
| 2015/0314777 A1* | 11/2015 | Koike | B60L 15/20 180/65.265 |
| 2015/0344025 A1* | 12/2015 | Park | B60W 20/40 180/65.265 |
| 2017/0297561 A1 | 10/2017 | Nakanishi et al. | |
| 2018/0180011 A1* | 6/2018 | Stalfors | F02N 15/022 |
| 2018/0208202 A1* | 7/2018 | Kobayashi | B60K 6/387 |
| 2019/0055911 A1* | 2/2019 | Hesketh | F02D 41/065 |
| 2019/0162153 A1* | 5/2019 | Kajiwara | F02D 29/06 |
| 2020/0298831 A1* | 9/2020 | Nakano | F02N 5/04 |

FOREIGN PATENT DOCUMENTS

| | | |
|---|---|---|
| JP | 10331749 A * | 12/1998 |
| JP | 2002-349310 A | 12/2002 |
| JP | 2009-208562 A | 9/2009 |
| JP | 2010-274735 A | 12/2010 |
| JP | 2014-240210 A | 12/2014 |
| JP | 2016-022832 A | 2/2016 |
| JP | 2016159767 A * | 9/2016 |
| JP | 2017-190037 A | 10/2017 |
| WO | 2009-109831 A1 | 9/2009 |

OTHER PUBLICATIONS

JP-2016159767-A translation (Year: 2016).*
JP-10331749-A translation (Year: 1998).*
CN-105365807-A translation (Year: 2016).*

* cited by examiner

CONTROLLER AND CONTROL METHOD FOR HYBRID VEHICLE

BACKGROUND

1. Field

The following description relates to a controller and a control method for a hybrid vehicle.

2. Description of Related Art

In some hybrid vehicles, a motor is arranged on a power transmission path between the engine and the wheels, and a clutch is arranged on a portion of the power transmission path between the engine and the motor. Such a hybrid vehicle has travel modes for the vehicle that include a first mode and a second mode. In the first mode, the vehicle travels using the power of the motor with the clutch disengaged and the engine stopped. In the second mode, the vehicle travels using the power of the engine with the clutch engaged and the engine operating. In a controller for a hybrid vehicle disclosed in Japanese Laid-Open Patent Publication No. 2009-208562, when the travel mode is switched from the first mode to the second mode, the engine is restarted by engaging the clutch and cranking the engine using the power of the motor. When the engine rotation speed increases to a value approximate to the motor rotation speed after the engine is restarted, the controller temporarily reduces the capacity of the torque transmitted by the clutch. This limits the generation of shock.

However, in a case in which the motor rotation speed is low, the engine rotation speed will exceed the motor rotation speed within a short period of time after the engine is restarted. Thus, in such a case, the capacity of the torque transmitted by the clutch cannot be timely reduced. This may cause the shock to be incompletely reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a controller for a hybrid vehicle according to an aspect of the present disclosure, the hybrid vehicle includes a motor arranged on a power transmission path between an engine and a wheel and includes a clutch arranged on a portion of the power transmission path between the engine and the motor. The controller is configured to cause the hybrid vehicle to travel in a travel mode selected from multiple travel modes that include a first travel mode of traveling with the clutch disengaged and operation of the engine stopped and a second travel mode of traveling with the clutch engaged and the engine operating. The controller includes processing circuitry configured to restart the engine in a first start mode of starting combustion in the engine with the clutch non-fully engaged or a second start mode of starting combustion in the engine with the clutch fully engaged. The processing circuitry is configured to restart the engine in the first start mode when a rotation speed of the motor is greater than a determination value upon a request for switching from the first travel mode to the second travel mode and restart the engine in the second start mode when the rotation speed of the motor is less than or equal to the determination value upon the request for switching from the first travel mode to the second travel mode.

In a control method for a hybrid vehicle, the hybrid vehicle includes a motor arranged on a power transmission path between an engine and a wheel and includes a clutch arranged on a portion of the power transmission path between the engine and the motor. The control method includes causing the hybrid vehicle to travel in a travel mode selected from multiple travel modes that include a first travel mode of traveling with the clutch disengaged and operation of the engine stopped and a second travel mode of traveling with the clutch engaged and the engine operating. The control method also includes restarting the engine in a first start mode of starting combustion in the engine with the clutch non-fully engaged when a rotation speed of the motor is greater than a determination value upon a request for switching from the first travel mode to the second travel mode. The control method further includes restarting the engine in a second start mode of starting combustion in the engine with the clutch fully engaged when the rotation speed of the motor is less than or equal to the determination value upon the request for switching from the first travel mode to the second travel mode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller and a control method for a hybrid vehicle according to a first embodiment will now be described with reference to FIGS. 1 to 7.

Figure 1:
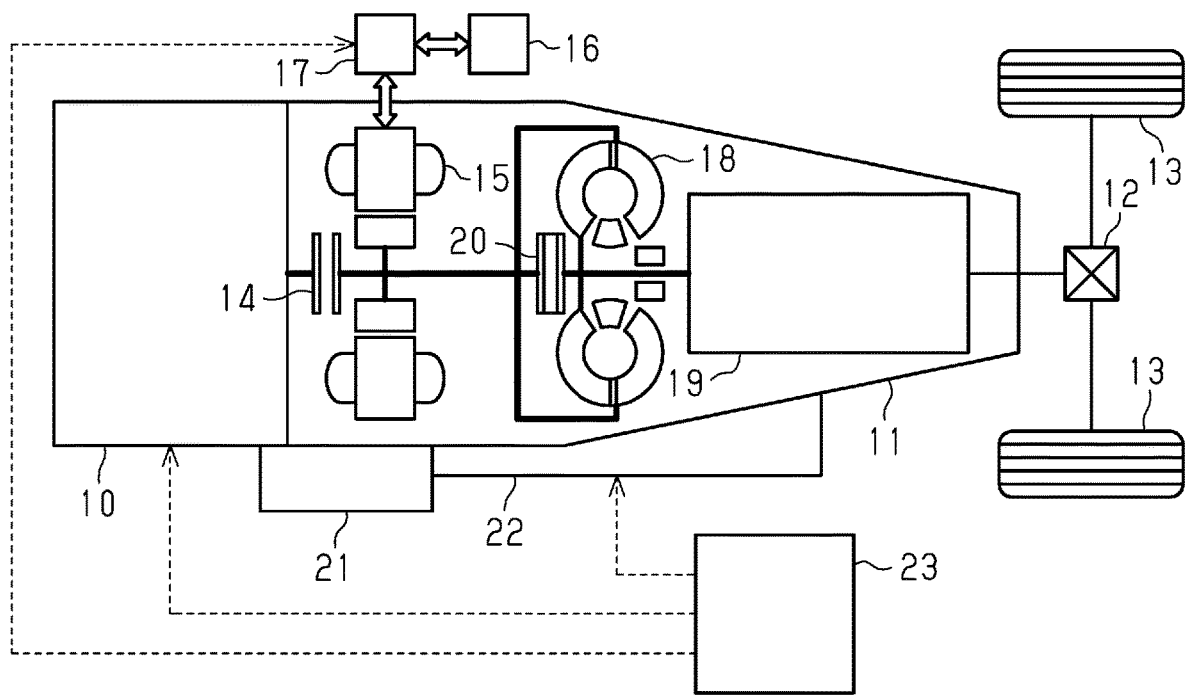
FIG. 1 is a schematic diagram showing the configuration of a controller for a hybrid vehicle and a driving system for the hybrid vehicle according to a first embodiment.

As shown in FIG. 1, the hybrid vehicle includes an engine 10 that is a driving source for traveling. A shifting unit 11 is provided on a power transmission path of the hybrid vehicle from the engine 10 to left and right wheels 13. The shifting unit 11 is coupled to the left and right wheels 13 by a differential apparatus 12 in a drivable manner.

The shifting unit 11 includes a clutch 14 and a motor generator 15 (M/G 15). The M/G 15 is located on the power transmission path from the engine 10 to the wheels 13. The clutch 14 is located on a portion of the power transmission path between the engine 10 and the M/G 15. When supplied with hydraulic pressure, the clutch 14 becomes engaged to allow for power transmission between the engine 10 and the M/G 15. When the supply of hydraulic pressure to the clutch 14 is stopped, the clutch 14 becomes disengaged to disconnect the power transmission between the engine 10 and the M/G 15.

The M/G 15 is connected to an onboard power supply 16 by an inverter 17. The M/G 15 functions as a motor that generates a drive force of the vehicle when powered by the onboard power supply 16 and also functions as a generator that generates electric power for charging the onboard power supply 16 when power is transmitted from the engine 10 or the wheels 13. The electric power transmitted and received to and from the M/G 15 and the onboard power supply 16 is adjusted by the inverter 17.

The shifting unit 11 also includes a torque converter 18 and a multi-speed automatic transmission 19. The torque converter 18 is a fluid coupling that has a torque amplification function. The automatic transmission 19 switches the gear ratio in multiple stages by switching the gear stage. The automatic transmission 19 is located at a portion of the power transmission path between the M/G 15 and the differential apparatus 12. The M/G 15 and the automatic transmission 19 are coupled to each other by the torque converter 18. The torque converter 18 includes a lock-up clutch 20. When supplied with hydraulic pressure, the lock-up clutch 20 becomes engaged to directly couple the motor 15 to the automatic transmission 19.

The shifting unit 11 further includes an oil pump 21 and a hydraulic pressure control unit 22. The hydraulic pressure generated by the oil pump 21 is supplied by the hydraulic pressure control unit 22 to the clutch 14, the torque converter 18, the automatic transmission 19, and the lock-up clutch 20. The hydraulic pressure control unit 22 includes hydraulic circuits for the clutch 14, the torque converter 18, the automatic transmission 19, and the lock-up clutch 20 and includes various types of hydraulic control valves for controlling the hydraulic pressures in these hydraulic circuits.

In addition, the hybrid vehicle includes a vehicle control unit 23, which is a controller for the vehicle. The vehicle control unit 23 is an electronic control unit including a calculation processor that performs various types of calculation processes for travel control of the vehicle and a storage device that stores programs and data for control. The vehicle control unit 23 performs driving control of the engine 10. Further, the vehicle control unit 23 controls the inverter 17 and adjusts the amount of electric power transmitted and received to and from the M/G 15 and the onboard power supply 16 to perform torque control of the M/G 15. The vehicle control unit 23 controls the hydraulic pressure control unit 22 to perform drive control of the clutch 14, the lock-up clutch 20, and the automatic transmission 19. The vehicle control unit 23 receives various types of detection signals such as the vehicle speed and the depression amount of the accelerator pedal (accelerator operation amount).

Figure 2:
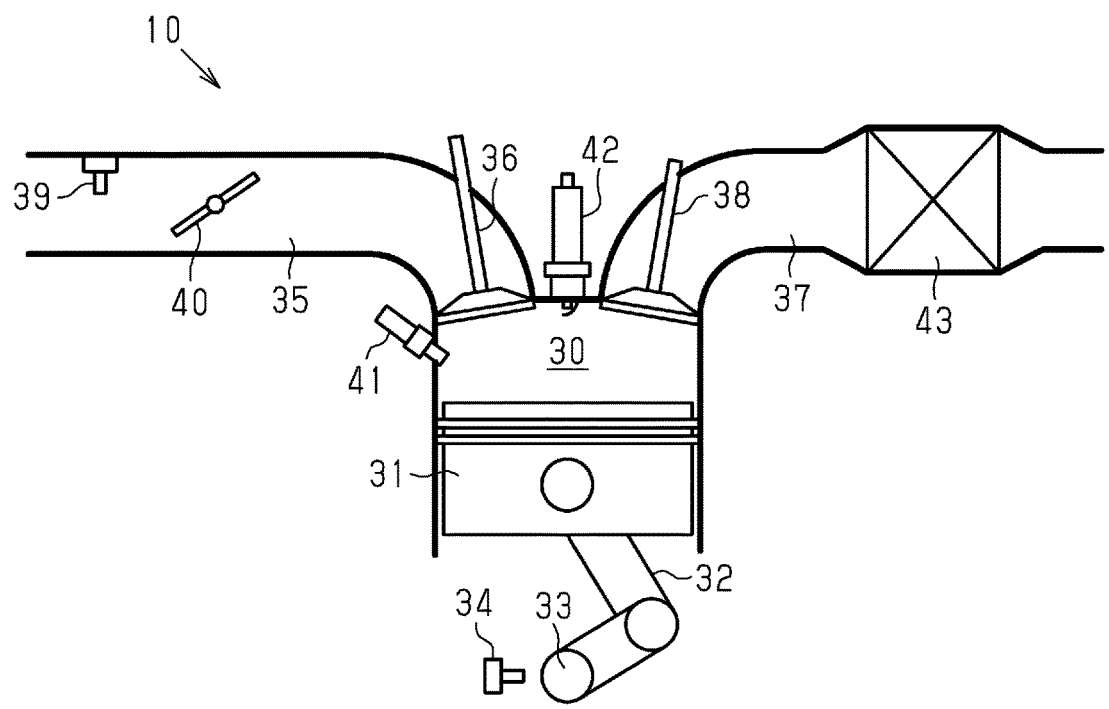
FIG. 2 is a schematic diagram showing the configuration of the engine installed in the hybrid vehicle of FIG. 1.

As shown in FIG. 2, the engine 10 includes a cylinder 30 in which air-fuel mixture is burned. FIG. 2 shows only one of multiple cylinders 30 of the engine 10. Each cylinder 30 accommodates a piston 31 such that the piston 31 can reciprocate in the cylinder 30. The piston 31 of each cylinder 30 is coupled to a crankshaft 33, which is an output shaft of the engine 10, by a connecting rod 32. The connecting rod 32 and the crankshaft 33 configure a crank mechanism that converts reciprocating motion of the piston 31 into rotational motion of the crankshaft 33. The engine 10 includes a crank angle sensor 34 that detects a rotation angle of the crankshaft 33.

An intake passage 35, into which intake air is drawn, is connected to each cylinder 30 via an intake valve 36. An exhaust passage 37, out of which exhaust gas is discharged, is connected to each cylinder 30 via an exhaust valve 38. The intake passage 35 includes an airflow meter 39 and a throttle valve 40. The airflow meter 39 detects an intake air flow rate GA, which is the flow rate of intake air flowing through the intake passage 35. The throttle valve 40 adjusts the flow rate of intake air. In the engine 10, a fuel injection valve 41 is arranged in correspondence with each cylinder 30. The fuel injection valve 41 injects fuel into the cylinder 30. Each cylinder 30 includes an ignition device 42 that ignites, with spark discharge, air-fuel mixture of the intake air drawn in through the intake passage 35 and the fuel injected by the fuel injection valve 41. The exhaust passage 37 includes a catalyst device 43 that purifies exhaust gas.

In the present embodiment, the catalyst device 43 is a three-way catalyst device having an oxygen storage capability. The three-way catalyst device has the maximum exhaust purification capability when the air-fuel ratio of air-fuel mixture burned in the cylinder 30 is a stoichiometric air-fuel ratio. The three-way catalyst device having the oxygen storage capability stores oxygen in exhaust gas when the air-fuel ratio of air-fuel mixture is leaner than the stoichiometric air-fuel ratio and releases oxygen when the air-fuel ratio of air-fuel mixture is richer than the stoichiometric air-fuel ratio. Thus, the three-way catalyst device has a favorable exhaust purification capability even at air-fuel ratios other than the stoichiometric air-fuel ratio. However, there is a limit to the amount of oxygen that can be stored. When the amount exceeds the limit, the sufficient exhaust purification capability may be insufficient.

The above-described vehicle control unit 23 receives detection signals of the crank angle sensor 34 and the airflow meter 39. Further, the vehicle control unit 23 calculates an engine rotation speed NE from the detection signal of the crank angle sensor 34 as an interruption process executed whenever the crankshaft 33 is rotated by an angle corresponding to a given angle. The vehicle control unit 23 performs an open degree control of the throttle valve 40, a fuel injection control of the fuel injection valve 41, and an ignition control of the ignition device 42 to perform driving control of the engine 10.

Further, the vehicle control unit 23 switches between a first travel mode of traveling by stopping the operation of the engine 10 and a second travel mode of traveling by operating the engine 10 depending on traveling situations. In the first travel mode, the vehicle travels using the power of the M/G 15 with the operation of the engine 10 stopped and the clutch 14 disengaged. In the second travel mode, the vehicle travels using the power of the engine 10 with the engine 10 operated and the clutch 14 engaged. In the second travel mode, travel assist with power driving of the M/G 15 and regenerative power generation with regenerative driving of the M/G 15 are performed depending on traveling situations of the vehicle. For example, the travel mode is switched in reference to a requested drive force of the vehicle obtained from the vehicle speed and the accelerator position and in reference to a charge state of the onboard power supply 16.

Such switching from the first travel mode to the second travel mode is performed by restarting the stopped engine 10 and engaging the disengaged clutch 14. In the present embodiment, a first start mode of starting combustion in the engine 10 with the clutch 14 non-fully engaged or a second start mode of starting combustion in the engine 10 with the clutch 14 fully engaged is selected, and the engine 10 is restarted in the selected start mode. The vehicle control unit 23 is a restart control unit that performs control on restarting of the engine 10.

When the first start mode is selected, the travel mode is switched from the first travel mode to the second travel mode in the procedure described below. First, fuel is injected into a cylinder 30 with the piston 31 in a stopped state in the expansion stroke, and at the same time, the supply of hydraulic pressure to the clutch 14 is started. Then, when the clutch 14 starts transmitting torque of the M/G 15, ignition is performed in the cylinder 30 into which fuel has been injected, and the torque of the M/G 15 transmitted through the clutch 14 and the torque generated through combustion in the cylinder 30 are used to start rotating the engine 10. Subsequently, the hydraulic pressure supplied to the clutch 14 is gradually increased as the engine rotation speed increases, and the clutch 14 is fully engaged when the engine rotation speed becomes almost the same as the rotation speed of the M/G 15 (i.e., M/G rotation speed).

When the clutch 14 is fully engaged, the engine 10 and the M/G 15 can be integrally rotated. In the following description, the state of the clutch 14 from when the transmission of torque is started to when the clutch 14 is fully engaged is referred to as a slipping state.

When the second start mode is selected, the travel mode is switched from the first travel mode to the second travel mode in the procedure described below. In this case, the supply of hydraulic pressure to the clutch 14 is started, and rotation of the engine 10 is started using only the torque of the M/G 15 transmitted through the clutch 14. Subsequently, the hydraulic pressure supplied to the clutch 14 is gradually increased, and the clutch 14 is fully engaged when the engine rotation speed becomes almost the same as the M/G rotation speed. After the engine 10 and the M/G 15 start integrally rotating, combustion in the engine 10 starts.

Figure 3:
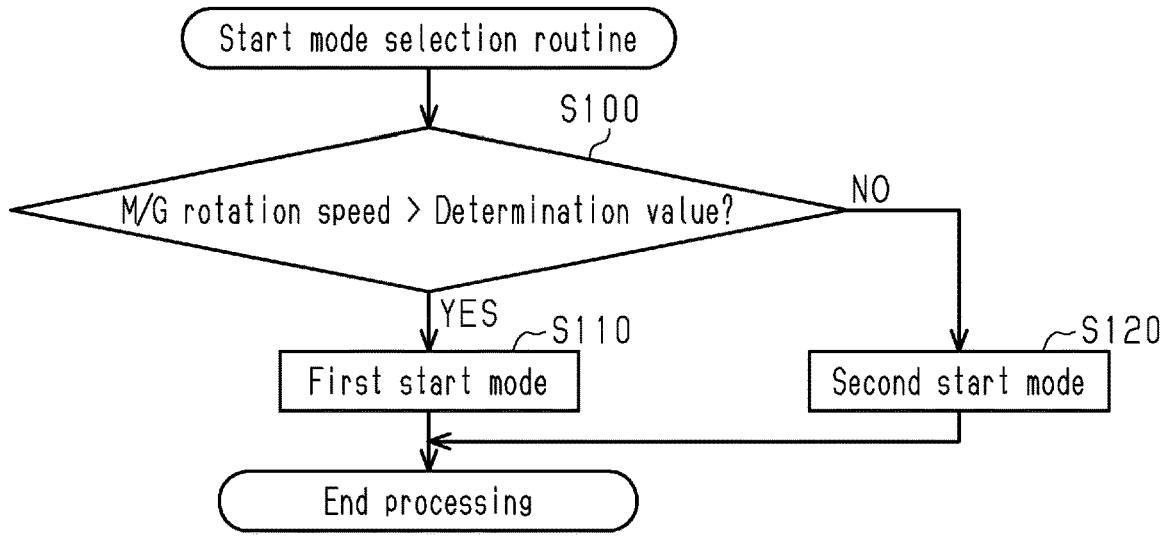
FIG. 3 is a flowchart illustrating a start mode selection routine executed by the controller of FIG. 1.

FIG. 3 shows a flowchart of a start mode selection routine for selecting the start mode when switching from the first travel mode to the second travel mode. The vehicle control unit 23 executes the processing of the routine upon a request for switching from the first travel mode to the second travel mode. As shown in FIG. 3, when the processing of the routine is started, in step S100, the vehicle control unit 23 first determines whether the M/G rotation speed is greater than a given determination value. When the M/G rotation speed is greater than the determination value (YES), the vehicle control unit 23 selects the first start mode (S110). When the M/G rotation speed is less than or equal to the determination value (NO), the vehicle control unit 23 selects the second start mode (S120).

The operation and advantages of the present embodiment will now be described.

Figure 4:
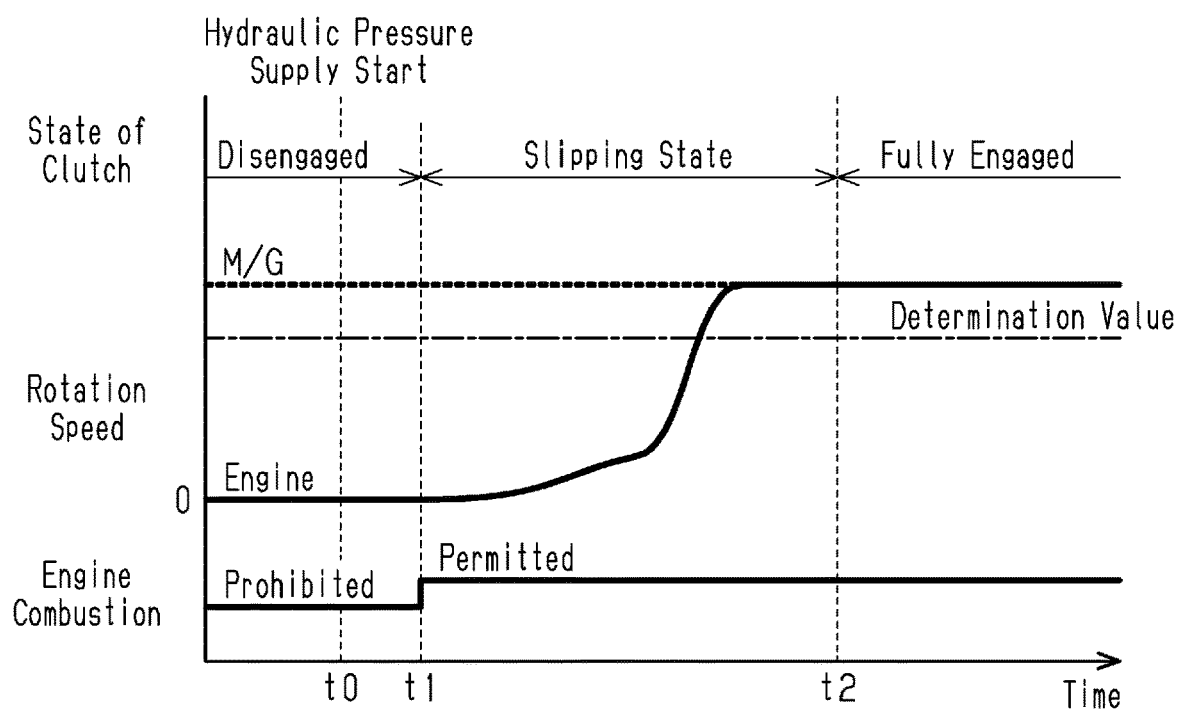
FIG. 4 is a timing diagram illustrating a state in which the engine is restarted in the first start mode when the M/G rotation speed is high.

FIG. 4 shows a state in which the engine 10 is restarted in the first start mode to switch the travel mode from the first travel mode to the second travel mode when the M/G rotation speed is greater than the determination value. At time t0 in FIG. 4, upon a request for switching from the first travel mode to the second travel mode, the supply of hydraulic pressure to the clutch 14 is started. Subsequently, at time t1, when the clutch 14 shifts to a slipping state and the transmission of the torque of the M/G 15 to the engine 10 is started, the combustion in the engine 10 is started. Then, the rotation speed of the engine 10 is increased by the combustion torque and the torque transmitted from the M/G 15. At time t2, when the engine rotation speed is equal to the M/G rotation speed, the clutch 14 is fully engaged. This completes the switching to the second travel mode.

Figure 5:
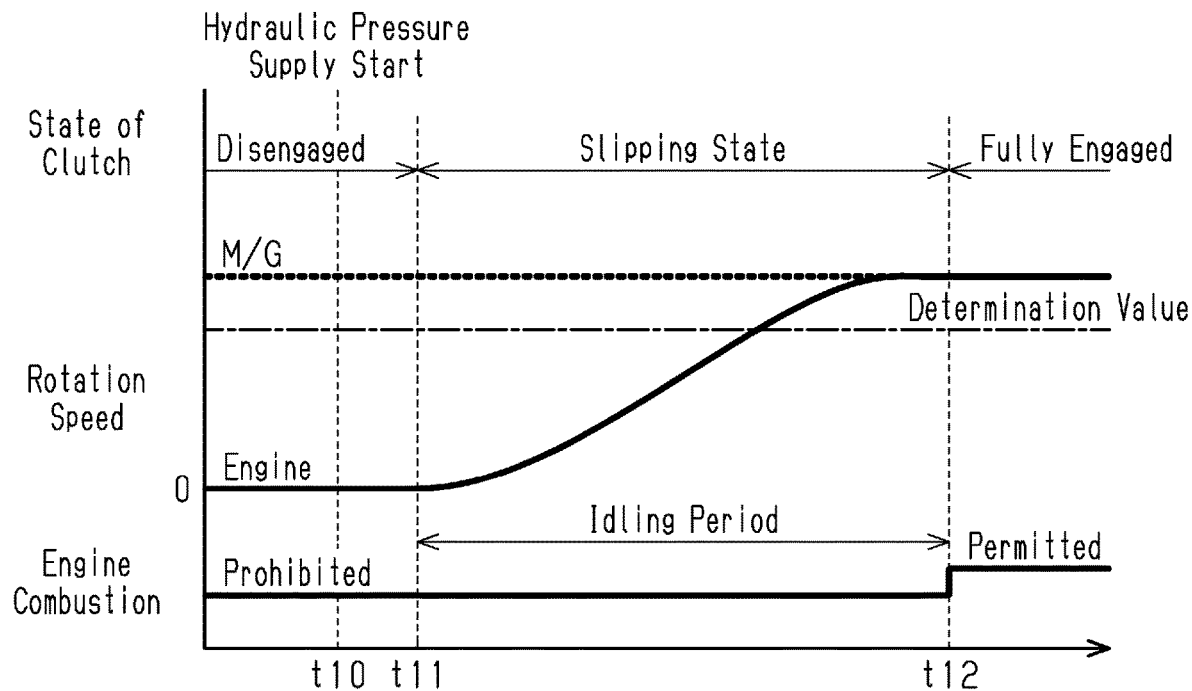
FIG. 5 is a timing diagram illustrating a state in which the engine is restarted in the second start mode when the M/G rotation speed is high.

FIG. 5 shows a state in which the engine 10 is restarted in the second start mode to switch the travel mode from the first travel mode to the second travel mode when the M/G rotation speed is greater than the determination value. At time t10 in FIG. 5, upon a request for switching from the first travel mode to the second travel mode, the supply of hydraulic pressure to the clutch 14 is started. In this case, at time t11, even when the clutch 14 shifts to a slipping state, the combustion in the engine 10 remains prohibited. At time t12, when the engine rotation speed becomes equal to the M/G rotation speed to fully engage the clutch 14, the combustion in the engine 10 is started. This completes the switching to the second travel mode. In this case, the engine rotation speed needs to be increased using only the torque transmitted from the M/G 15. Thus, as compared to the first start mode, it takes a longer time for the engine rotation speed to increase to the rotation speed that is equal to the M/G rotation speed. This delays the switching from the first travel mode to the second travel mode. During the period in which the engine rotation speed increases in such a manner, the engine 10 rotates idly and fresh air flows into the exhaust passage 37. Thus, the oxygen storage amount of the catalyst device 43 may reach a limit. In this case, the exhaust purification capability of the catalyst device 43 may become insufficient after the combustion in the engine 10 starts. When the M/G rotation speed is high, the switching to the second travel mode can be performed in a more favorable manner by restarting the engine 10 in the first start mode than in the second start mode.

Figure 6:
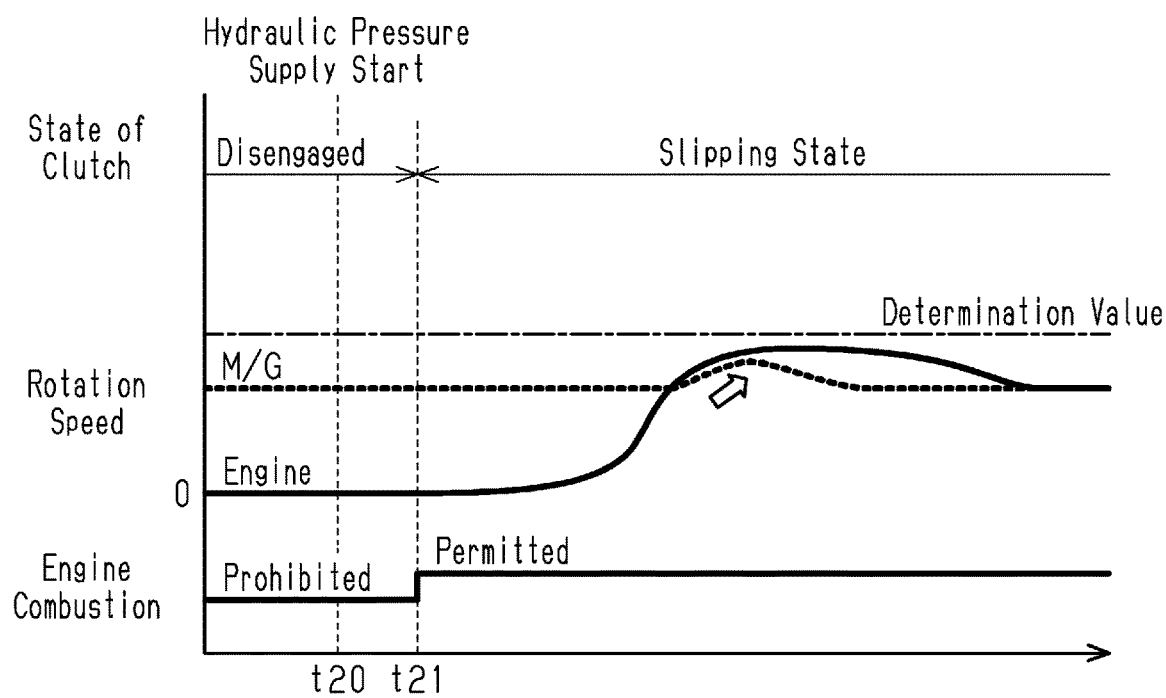
FIG. 6 is a timing diagram illustrating a state in which the engine is restarted in the first start mode when the M/G rotation speed is low.

FIG. 6 shows a state in which the engine 10 is restarted in the first start mode to switch the travel mode from the first travel mode to the second travel mode when the M/G rotation speed is less than or equal to the determination value. In this case, at time t20, upon a request for switching the travel mode, the supply of hydraulic pressure to the clutch 14 is started. Subsequently, when the clutch 14 shifts to a slipping state and the transmission of the torque of the M/G 15 to the engine 10 is started at time t21, the combustion in the engine 10 is started. However, in this case, since the M/G rotation speed is low, the engine rotation speed reaches the same rotation speed as the M/G rotation speed within a short period of time after the combustion is started. Thus, the clutch 14 may not be able to be fully engaged by the point in time at which the engine rotation speed reaches the same rotation speed as the M/G rotation speed. When the clutch 14 is fully engaged, the engine torque is fully transmitted to the M/G 15. Thus, adjusting the torque of the M/G 15 in correspondence with the engine torque limits variations in the drive force conveyed to the wheels 13. Nevertheless, when the clutch 14 is in a slipping state, it is difficult to accurately ascertain the transmission torque from the engine 10 to the M/G 15. In such a state, when the engine rotation speed exceeds the M/G rotation speed, the torque of the M/G 15 cannot be properly adjusted. This may increase the M/G rotation speed and generate shock.

Figure 7:
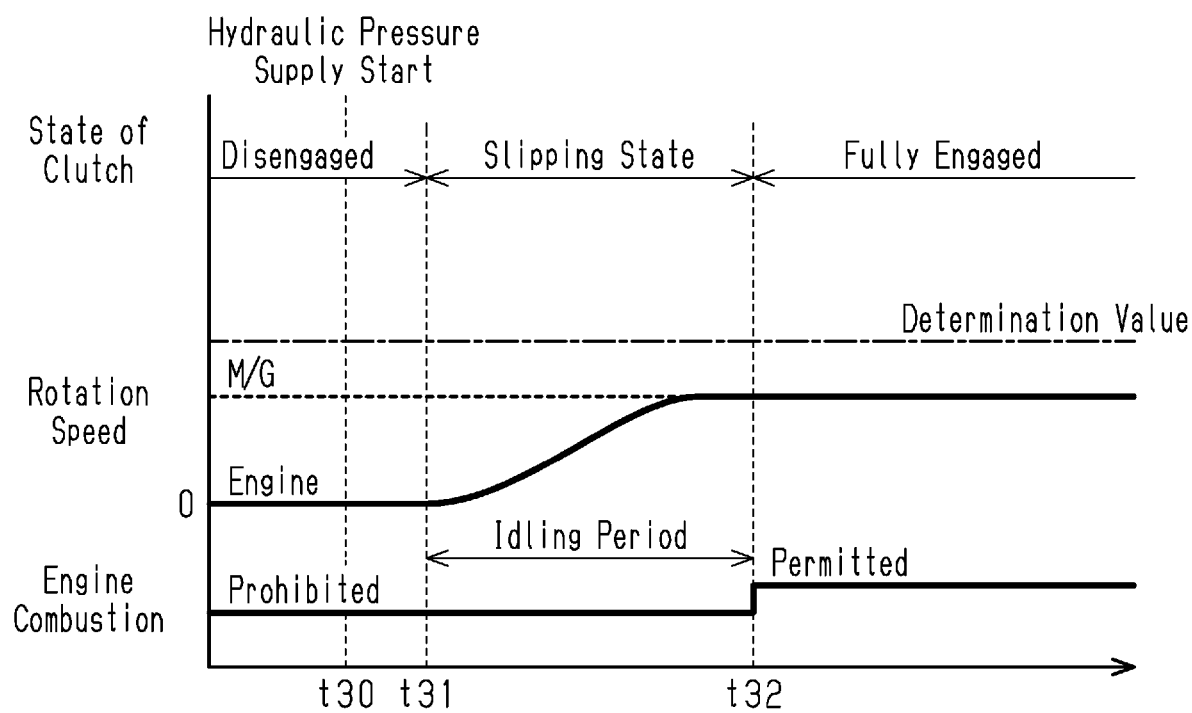
FIG. 7 is a timing diagram illustrating a state in which the engine is restarted in the second start mode when the M/G rotation speed is low.

FIG. 7 shows a state in which the engine 10 is restarted in the second start mode to switch the travel mode from the first travel mode to the second travel mode when the M/G rotation speed is less than or equal to the determination value. In this case, at time t30, upon a request for switching the travel mode, the supply of hydraulic pressure to the clutch 14 is started. Subsequently, at time t31, the clutch 14 shifts to a slipping state to start transmitting the torque of the M/G 15 to the engine 10. At time t32, when the clutch 14 shifts from a slipping state to a fully-engaged state, the combustion in the engine 10 is started. In this case, the combustion in the engine 10 is started after the clutch 14 is fully engaged. Thus, even when the M/G rotation speed is low, shock can be limited. In such a manner, when the M/G rotation speed is low, the switching to the second travel mode can be performed in a more favorable manner by restarting the engine 10 in the second start mode than in the first start mode.

The present embodiment has the following advantages.

(1) When the clutch 14 is fully engaged with a large difference between the engine rotation speed and the M/G rotation speed, shock occurs. Thus, the clutch 14 needs to be fully engaged after the difference in the rotation speeds sufficiently decreases. In the second start mode, in which combustion in the engine 10 is not started until the clutch 14 becomes fully engaged, the engine rotation speed needs to be increased to the M/G rotation speed only by the torque transmitted from the M/G 15 through the clutch 14 in a slipping state (i.e., only by cranking), Thus, when the travel mode is switched to the second travel mode by restarting the engine 10 in the second start mode at a high M/G rotation speed, it takes time for the clutch 14 to be fully engaged to start the combustion in the engine 10. This lengthens the time to switch the travel mode. In the present embodiment, when the M/G rotation speed is greater than the determination value, the travel mode is switched to the second travel mode by restarting the engine 10 in the first start mode, in which combustion is started before the clutch 14 becomes fully engaged. In the first start mode, the combustion torque of the engine 10 can be used to increase the engine rotation speed to the M/G rotation speed. This shortens the time to complete the switching to the second travel mode.

(2) When the travel mode is switched to the second travel mode by restarting the engine 10 at a high M/G rotation speed, the engine 10 rotates idly for a longer period. In this case, after combustion resumes, the exhaust purification capability of the catalyst device 43 is insufficient. This may deteriorate the exhaust efficiency. In the present embodiment, when the M/G rotation speed is greater than the determination value, the engine 10 is restarted in the first start mode, in which combustion is started before the idling period passes. This avoids deterioration in the exhaust efficiency.

(3) When the travel mode is switched to the second travel mode by restarting the engine 10 in the first start mode at a low M/G rotation speed, the engine rotation speed may exceed the M/G rotation speed after the combustion in the engine 10 starts, so that shock may occur. In the present embodiment, when the M/G rotation speed is less than or equal to the determination value, the travel mode is switched to the second travel mode by restarting the engine 10 in the second start mode. This limits the occurrence of the shock. When the M/G rotation speed is low, a long period of time is not needed to increase the engine rotation speed to the M/G rotation speed only by cranking. This allows the travel mode to be switched to the second travel mode even in the second start mode within a short period of time.

(4) The engine 10 is restarted in the first start mode when the M/G rotation speed is high and restarted in the second start mode when the M/G rotation speed is low. Thus, both when the M/G rotation speed is low and when the M/G rotation speed is high, the travel mode can be smoothly switched from the first travel mode to the second travel mode.

Second Embodiment

A controller and a control method for a hybrid vehicle according to a second embodiment will now be described. In the second embodiment, the same reference numerals are given to those components that are the same as the corresponding components of the above-described first embodiment and detailed description thereof is omitted.

In the first embodiment, when the M/G rotation speed is low and the engine rotation speed may increase beyond the M/G rotation speed after combustion starts, the second start mode is selected. When the M/G rotation speed is high and the engine rotation speed may not increase beyond the M/G rotation speed after combustion starts, the first start mode is selected. The increase amount of the engine rotation speed after combustion starts varies depending on situations. For example, when the engine 10 is not sufficiently warmed up and the viscosity of lubricant in the engine 10 is high, the engine friction is large. This decreases the increase amount of the engine rotation speed after combustion starts. Since the increase amount of the engine rotation speed after combustion starts changes depending on situations, an optimal boundary value of the M/G rotation speed at which the start mode is switched between the first start mode and the second start mode (i.e., an optimal determination value used for the determination in step S100 of the start mode selection routine in FIG. 3) changes depending on situations.

In the present embodiment, to restart the engine 10 when the travel mode is switched from the first travel mode to the second travel mode, the increase amount of the engine rotation speed after combustion starts is measured. The determination value is updated in correspondence with the measured increase amount.

More specifically, the vehicle control unit 23 checks whether the engine rotation speed increases beyond the M/G rotation speed when the engine 10 is restarted in the first start mode. When the engine rotation speed exceeds the M/G rotation speed, the vehicle control unit 23 updates the determination value to be larger than the current value. The determination value is reset to a preset initial value when the vehicle is activated.

As described above, in a case in which the engine rotation speed increases beyond the M/G rotation speed before the clutch becomes fully engaged when the engine 10 is restarted in the first start mode, rotation of the engine 10 may increase the M/G rotation speed and cause shock. Such shock can be reliably prevented by setting the determination value taking into consideration a situation in which the increase amount of the engine rotation speed after combustion starts becomes the maximum. However, such a situation where the increase amount of the engine rotation speed after combustion starts becomes the maximum is rare. Thus, when the determination value is set by taking such a situation into consideration, restarting of the engine 10 in the first start mode, which has a shorter idling period of the engine 10 and is more favorable in the discharge performance than in the second start mode, is unnecessarily limited.

In the present embodiment, when the engine 10 is restarted in the first start mode, only in a case in which it is checked that the engine rotation speed increases beyond the M/G rotation speed, the determination value is increased. In such a case, although shock may occur when the engine 10 is restarted in the first start mode for the first time after the vehicle is activated, further shock is less likely to occur when the engine 10 is restarted subsequent to next time.

While the determination value is updated to be larger than the current value in the above-mentioned description, the determination value may be updated to be smaller than the current value when, for example, the engine rotation speed after combustion starts does not exceed the M/G rotation speed.

The above-described embodiments may be modified as follows. The above-described embodiments and the following modifications can be combined as long as the combined modifications remain technically consistent with each other.

Instead of the multi-speed automatic transmission, a continuously variable transmission may be employed.

In addition to the first travel mode and the second travel mode, the travel mode may include an additional travel mode.

The vehicle control unit 23 may be processing circuitry including: 1) one or more processors that operate according to a computer program (software); 2) one or more dedicated hardware circuits such as application specific integrated circuits (ASICs) that execute at least part of various processes; or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid vehicle, the hybrid vehicle including a motor arranged on a power transmission path between an engine and a wheel and including a clutch arranged on a portion of the power transmission path between the engine and the motor, the controller being configured to cause the hybrid vehicle to travel in a travel mode selected from multiple travel modes that include a first travel mode of traveling with the clutch disengaged and operation of the engine stopped, and a second travel mode of traveling with the clutch engaged and the engine operating, the controller comprising:
processing circuitry configured to restart the engine in a first start mode of starting combustion in the engine with the clutch non-fully engaged or a second start mode of starting combustion in the engine with the clutch fully engaged, the clutch transmitting torque in a non-slipping state so that the engine and the motor are integrally rotated when the clutch is fully engaged, wherein
the processing circuitry is configured to:
restart the engine in the first start mode when a rotation speed of the motor is greater than a determination value upon a request for switching from the first travel mode to the second travel mode; and
restart the engine in the second start mode when the rotation speed of the motor is less than or equal to the determination value upon the request for switching from the first travel mode to the second travel mode.

2. The controller according to claim 1, wherein the processing circuitry is configured to update the determination value in correspondence with an increase amount of an engine rotation speed after combustion in the engine is started.

3. The controller according to claim 2, wherein the processing circuitry is configured to update the determination value to be larger than a current value when the engine rotation speed increases beyond the rotation speed of the motor when the engine is restarted in the first start mode.

4. A control method for a hybrid vehicle, the hybrid vehicle including a motor arranged on a power transmission path between an engine and a wheel and including a clutch arranged on a portion of the power transmission path between the engine and the motor, the control method comprising:
causing the hybrid vehicle to travel in a travel mode selected from multiple travel modes that include a first travel mode of traveling with the clutch disengaged and operation of the engine stopped and a second travel mode of traveling with the clutch engaged and the engine operating;
restarting the engine in a first start mode of starting combustion in the engine with the clutch non-fully engaged when a rotation speed of the motor is greater than a determination value upon a request for switching from the first travel mode to the second travel mode; and
restarting the engine in a second start mode of starting combustion in the engine with the clutch fully engaged when the rotation speed of the motor is less than or equal to the determination value upon the request for switching from the first travel mode to the second travel mode, the clutch transmitting torque in a non-slipping state so that the engine and the motor are integrally rotated when the clutch is fully engaged.

* * * * *